Sept. 17, 1963
R. J. HOVEY
3,104,176
OPTICAL FILTERS AND METHOD OF MAKING SAME
Filed Jan. 17, 1961
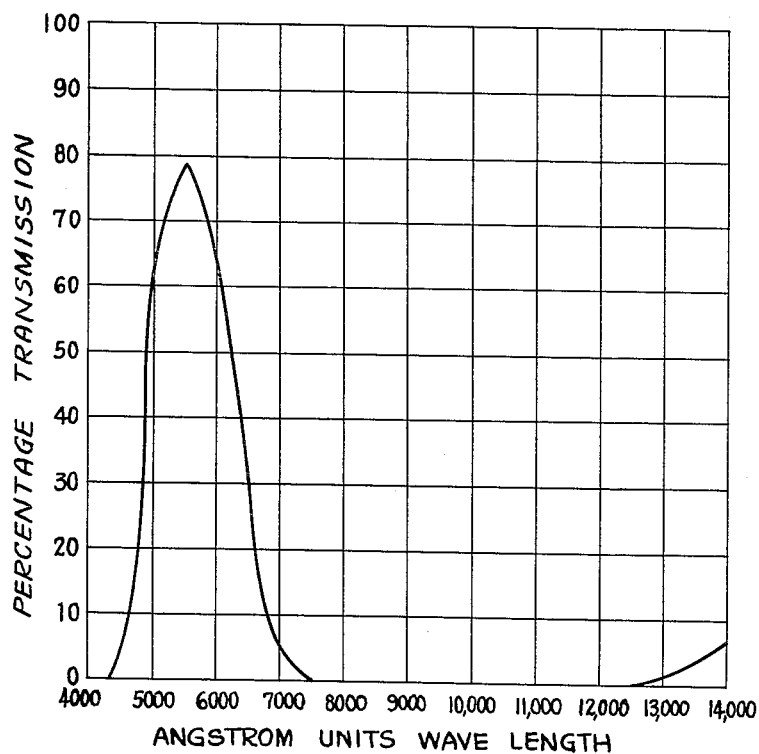
INVENTOR
RICHARD J. HOVEY
BY
ATTORNEYS

United States Patent Office 3,104,176
Patented Sept. 17, 1963

---

3,104,176
OPTICAL FILTERS AND METHOD OF MAKING SAME
Richard J. Hovey, Worcester, Mass., assignor to American Optical Company, Southbridge, Mass., a voluntary association of Massachusetts
Filed Jan. 17, 1961, Ser. No. 83,360
2 Claims. (Cl. 117—33.3)

The field of this invention is that of light-absorbing filters, and the invention relates, more particularly, to a novel and improved plastic filter material and to novel and improved methods for manufacturing such a filter material.

At the present time, filter materials of a vitreous nature are used in many different applications where plastic filter materials would be preferred for various reasons if plastic materials could be adapted to display the desired absorptive and transmissive characteristics. For example, a plastic material adapted for high transmission of visible light would be useful as a substitute for vitreous materials presently employed in sun glasses and the like. Until the present invention, attempts to develop plastic materials with suitably high transmitting properties for visible light and suitably high absorbing properties for infra-red light have been largely unsuccessful.

It is an object of this invention to provide a novel and improved plastic filter material and methods for manufacturing such a material; to provide a plastic material and methods for manufacturing such a material which is adapted for relatively high transmission of visible light and for relatively high absorption of infra-red and ultra-violet light; to provide a plastic material and methods for manufacturing such a material which is highly transparent to visible light of at least selected wavelengths and which is adapted for substantially completely cut-off of light from at least selected portions of the infrared and ultra-violet regions of the spectrum; and to provide such methods for material manufacture which can be conveniently and economically performed.

Other objects and advantages of the plastic filter material and methods for material manufacture provided by this invention will appear in the following detailed description of a preferred embodiment of the material and method, the description referring to the drawing illustrates the absorption and transmission characteristics of said preferred embodiment of the plastic filter material.

According to this invention, a normally transparent, non-absorbing, plastic, polyvinyl alcohol material is used to form a matrix or carrier for metallic salts which are adapted to transmit visible light and to absorb infra-red and ultra-violet light, the salts being established in dispersed relation within the plastic material so that the plastic material itself is adapted for high transmission of visible light and for high absorption of infra-red and ultra-violet light. It will be noted that the term "light" as used herein is intended to include all radiations of the electromagnetic spectrum including infra-red and ultra-violet radiations as well as visible light.

In the method provided by this invention for manufacturing plastic filter material, a cupric chloride salt is dissolved in relatively high concentration in an aqueous solution, and a polyvinyl alcohol material is immersed in the solution to permit imbibition of a solution by the plastic. The plastic material tends to swell slightly during imbibition but establishes the cupric chloride salt carried by the solution in dispersed relation throughout the polyvinyl alcohol material. The plastic material is then removed from the solution and is permitted to dry in air, preferably at room temperature. This method provides a plastic filter material which is highly transparent to visible light of at least selected wavelengths and which is highly absorptive for light from at least selected portions of the infra-red and ultra-violet regions of the spectrum. It is believed that the very desirable absorptive and transmissive properties of the plastic material are derived from the dispersal therein of the metallic cations embodied in the cupric chloride salt.

The polyvinyl alcohol material employed in the above-described process is preferably provided in the form of a thin film which can be supported by a suitable substrate material prior to treatment or can be sandwiched between supporting materials after treatment if desired. However, the polyvinyl alcohol material can also be provided in the form of relatively thick sheets or plates or can comprise cast objects such as lenses within the scope of this invention.

The cupric chloride salt must be dissolved in an aqueous solution in relatively high concentration in order to establish a salt dispersion in the plastic which is sufficient to provide the plastic material with significant infra-red and ultra-violet absorbing properties. For this purpose, a minimum concentration of the salt solution of approximately twenty percent (20%) would be required. On the other hand, concentrations of the salt solution up to about thirty-eight (38%), that is, solutions which are saturated at room temperature, can also be utilized with satisfactory results.

The absorptive and transmissive properties of the plastic filter material provided by this invention will, of course, be determined by the quantity or density of the salt dispersion within the plastic material, higher densities of salt dispersion adapting the plastic for reduced transmission of both visible and invisible light. As will be readily understood, the imbibition process of this invention can be easily regulated to provide a desired density of salt dispersion in a polyvinyl alcohol material by control of the concentration of the salt solution imbibed by the plastic, by control of the temperature at which imbibition of the solution is permitted to occur, and by control of the length of the imbibition period.

It should be noted that where the polyvinyl alcohol material is permitted to imbibe the described cupric chloride solution for an extended period of time, the maximum density of cupric chloride salt dispersion which can be established within the plastic will be determined primarily by the concentration of the solution. If the imbibition process is regulated solely by control of the concentration of the salt solution, the cupric chloride salt can be established in the plastic with highly uniform density. However, the salt can also be established within the plastic material with satisfactory uniformity of dispersion in a more convenient process by employing relatively higher concentrations of the salt solution for imbibition by the plastic material while reducing the length of the imbibition period. The length of the imbibition period required for establishing a predetermined density of salt dispersion in the plastic material can be further shortened by permitting the imbibition to occur at elevated temperatures. In this regard, it should be noted that the imbibition process would not normally be attempted at a temperature lower than room temperature. On the other hand, the employment of temperatures above 50° C. during the imbibition process introduces risk of swelling the polyvinyl alcohol film to an undesirable extent.

Where the cupric chloride solution utilized is at maximum concentration as noted above and where the imbibition procedure is carried out at the maximum allowable temperature as previously described, the polyvinyl alcohol material can be provided with significant infra-red and ultra-violet absorbing properties during an imbibition period as short as two (2) minutes. Conversely, where the imbibition process is performed at room temperature utilizing a cupric chloride solution of minimum concentration as noted above, the polyvinyl alcohol material can be provided with similar infra-red and ultra-violet absorbing properties following imbibition of the solution for approximately one (1) hour. Where imbibition occurs at room temperature using a cupric chloride solution of maximum concentration, the polyvinyl alcohol material can be provided with substantially greater infra-red and ultra-violet absorbing properties following a similar imbibition period of approximately one (1) hour.

Although the imbibition process can be varied within the limits prescribed above, a preferred process according to this invention can be carried out as follows. A cupric chloride solution of about thirty-four percent (34%) concentration is prepared by dissolving 750 grams of cupric chloride dihydrate in 1000 cc. of water, the dihydrate form of the cupric chloride being used for convenience only. A polyvinyl alcohol film of approximately 0.003 inch thickness is then laminated in the conventional manner to each side of a cellulose acetate film of approximately 0.010 inch thickness which has been subcoated with polyvinyl alcohol. The supported plastic film is then immersed in the cupric chloride solution at room temperature for a period of approximately one (1) hour to permit imbibition of the solution therein. Thereafter the film is removed from the solution and is permitted to dry in air at room temperature.

The treated plastic film, which was originally clear, will have a yellow-green color and will have absorptive and transmissive characteristics as illustrated in the curve of FIG. 1. As can be seen, the film is adapted for approximately eighty percent (80%) transmission of visible light of 5500 Angstrom units wavelength. The film is also adapted to effect almost complete absorption of ultra-violet and near ultra-violet light of wavelengths shorter than 4300 Angstrom units and of infra-red light of wavelengths between 7600 and 13,000 Angstrom units. Such a plastic material can be readily incorporated in inexpensive sunglasses in any well known manner and will retain its desirable infra-red and ultra-violet absorbing properties for a useful period of time. The plastic material can also serve as a useful filter for laboratory purposes. In this regard, it should be noted that the infra-red light which the plastic material is adapted to absorb comprises about seventy percent (70%) of the infra-red radiation which is perpendicularly incident upon the earth's surface on a clear day, and also comprises the infra-red radiation which is believed to be most harmful to vision.

Although a particular embodiment of the material and method of material manufacture provided by this invention has been described for the purpose of illustration, it should be understood that this invention includes all modifications and equivalents thereof which fall within the scope of the appended claims.

Having described my invention, I claim:

1. A method for making a plastic filter material which comprises the steps of providing an aqueous solution of cupric chloride in concentration between approximately twenty percent (20%) and thirty-eight percent (38%), providing a polyvinyl alcohol material, immersing the polyvinyl alcohol material in said solution for a period between two (2) minutes and approximately one (1) hour to permit imbibition of the solution by the polyvinyl alcohol material, regulating the temperature of the solution and polyvinyl alcohol material between room temperature and approximately 50° C. during said immersion, removing said polyvinyl alcohol material from said solution, and drying the polyvinyl alcohol material in air at room temperature, thereby to provide the polyvinyl alcohol material with a dispersal of said cupric chloride therein so that the polyvinyl alcohol material is adapted for relatively high transmission of visible light and for relatively high absorption of infra-red and ultra-violet light.

2. A method for making a plastic filter material which comprises the steps of providing an aqueous solution of cupric chloride of approximately thirty-four percent (34%) concentration, providing a polyvinyl alcohol film of approximately 0.003 inch thickness which is laminated to polyvinyl alcohol-subcoated cellulose acetate, immersing the polyvinyl alcohol film in said solution for approximately one (1) hour at room temperature to permit imbibition of the solution by the film, removing the film from said solution, and drying the film in air at room temperature, thereby to provide the polyvinyl alcohol film with a dispersal of said cupric chloride therein so that the film is adapted for approximately eighty percent (80%) transmission of light of 5500 Angstrom units wavelength, for substantially complete cut-off of ultra-violet and near ultra-violet light of wavelengths shorter than 4300 Angstrom units, and for substantially complete cut-off of infra-red light of wavelengths between 7600 and 13,000 Angstrom units.

References Cited in the file of this patent
UNITED STATES PATENTS

| | | |
|---|---|---|
| 2,662,035 | Levi | Dec. 8, 1953 |
| 2,816,047 | Mahler | Dec. 10, 1957 |